(12) United States Patent
Koo et al.

(10) Patent No.: US 7,682,583 B2
(45) Date of Patent: Mar. 23, 2010

(54) LEAN NO$_x$ TRAP/CONVERSION CATALYST

(75) Inventors: Kwangmo Koo, St. Davids, PA (US);
Paul Joseph Andersen, Plymouth Meeting, PA (US)

(73) Assignee: Johnson Matthey Public Limited Company, London (GB)

( * ) Notice: Subject to any disclaimer, the term of this patent is extended or adjusted under 35 U.S.C. 154(b) by 1167 days.

(21) Appl. No.: 10/878,240

(22) Filed: Jun. 28, 2004

(65) Prior Publication Data
US 2004/0258593 A1 Dec. 23, 2004

Related U.S. Application Data

(62) Division of application No. 09/956,424, filed on Sep. 19, 2001, now Pat. No. 6,756,338.

(51) Int. Cl.
*B01D 53/00* (2006.01)
(52) U.S. Cl. .................................. 423/239.1
(58) Field of Classification Search ............... 423/239.1
See application file for complete search history.

(56) References Cited

U.S. PATENT DOCUMENTS

| | | | |
|---|---|---|---|
| 4,071,600 A | | 1/1978 | Schlatter et al. |
| 4,675,308 A | | 6/1987 | Wan et al. |
| 5,075,274 A | | 12/1991 | Kiyohide et al. |
| 5,158,582 A | | 10/1992 | Onitsuka et al. |
| 5,451,558 A | | 9/1995 | Campbell et al. |
| 5,473,887 A | | 12/1995 | Takeshima et al. |
| 5,727,385 A | | 3/1998 | Hepburn |
| 5,750,082 A | | 5/1998 | Hepburn et al. |
| 5,756,057 A | * | 5/1998 | Tsuchitani et al. ....... 423/213.2 |
| 5,814,576 A | | 9/1998 | Yamamoto |
| 5,837,212 A | | 11/1998 | Hepburn et al. |
| 5,849,661 A | | 12/1998 | Yamashita et al. |
| 5,948,376 A | | 9/1999 | Miyoshi et al. |
| 6,083,868 A | | 7/2000 | Yoshida et al. |
| 6,182,443 B1 | | 2/2001 | Jarvis et al. |
| 6,350,421 B1 | | 2/2002 | Strehlau et al. |
| 6,375,910 B1 | | 4/2002 | Deeba et al. |
| 6,413,483 B1 | | 7/2002 | Brisley et al. |
| 6,413,904 B1 | | 7/2002 | Strehlau et al. |
| 6,419,890 B1 | | 7/2002 | Li |
| 6,461,579 B1 | | 10/2002 | Hachisuka et al. |
| 6,680,036 B1 | | 1/2004 | Fisher et al. |
| 6,897,182 B2 | | 5/2005 | Cutler et al. |
| 2002/0103078 A1 | | 8/2002 | Hu et al. |
| 2002/0182134 A1 | | 12/2002 | Wu |

FOREIGN PATENT DOCUMENTS

| | | |
|---|---|---|
| AU | 199944667 A1 | 3/2000 |
| AU | 199953609 A1 | 4/2000 |
| EP | 0 666 102 | 8/1995 |
| EP | 0 669 157 A1 | 8/1995 |
| EP | 0 764 459 A2 | 3/1997 |
| EP | 0 771 584 A1 | 5/1997 |
| EP | 0 778 072 | 6/1997 |
| EP | 0 838 255 A2 | 4/1998 |
| EP | 0 845 289 A1 | 6/1998 |
| EP | 0 852 966 A1 | 7/1998 |
| EP | 0 857 510 A1 | 8/1998 |
| EP | 0 982 066 A1 | 3/2000 |
| EP | 0 993 860 A1 | 4/2000 |
| EP | 1 033 161 | 9/2000 |
| JP | 63-080850 | 4/1998 |
| JP | 10-286461 | 10/1998 |
| WO | WO-97/43031 A2 | 11/1997 |
| WO | WO-98/03251 A1 | 1/1998 |
| WO | WO-99/26715 | 6/1999 |
| WO | WO-99/29417 A1 | 6/1999 |
| WO | WO-00/59611 A1 | 10/2000 |
| WO | WO-00/64580 | 11/2000 |
| WO | WO-00/67883 | 11/2000 |

OTHER PUBLICATIONS

Abstract of Japanese Publication No. 04-367707 (published Dec. 21, 1992).
International Search Report dated Feb. 6, 2003, from International Application No. PCT/GB02/04217.

* cited by examiner

*Primary Examiner*—Steven Bos
(74) *Attorney, Agent, or Firm*—RatnerPrestia

(57) ABSTRACT

A process and composition for converting nitrogen oxides present in exhaust gases produced by an internal combustion engine utilize cobalt and at least one alkali metal or alkaline earth metal as a component of an adsorbent. The process involves contacting the exhaust gas with an adsorbent which adsorbs the nitrogen oxides in lean-burn conditions and recurrently reducing the oxygen concentration of the exhaust gas. During such periods of reduced oxygen concentration, the nitrogen oxides are then desorbed and reduced to nitrogen, thereby reducing the concentration of the nitrogen oxides in the exhaust gas. The composition of the adsorbent comprises an oxide support and at least two components loaded on the support and containing cobalt and at least one alkali metal or alkaline earth metal. The composition demonstrates improved activity at higher temperatures and improved thermal stability.

13 Claims, 1 Drawing Sheet

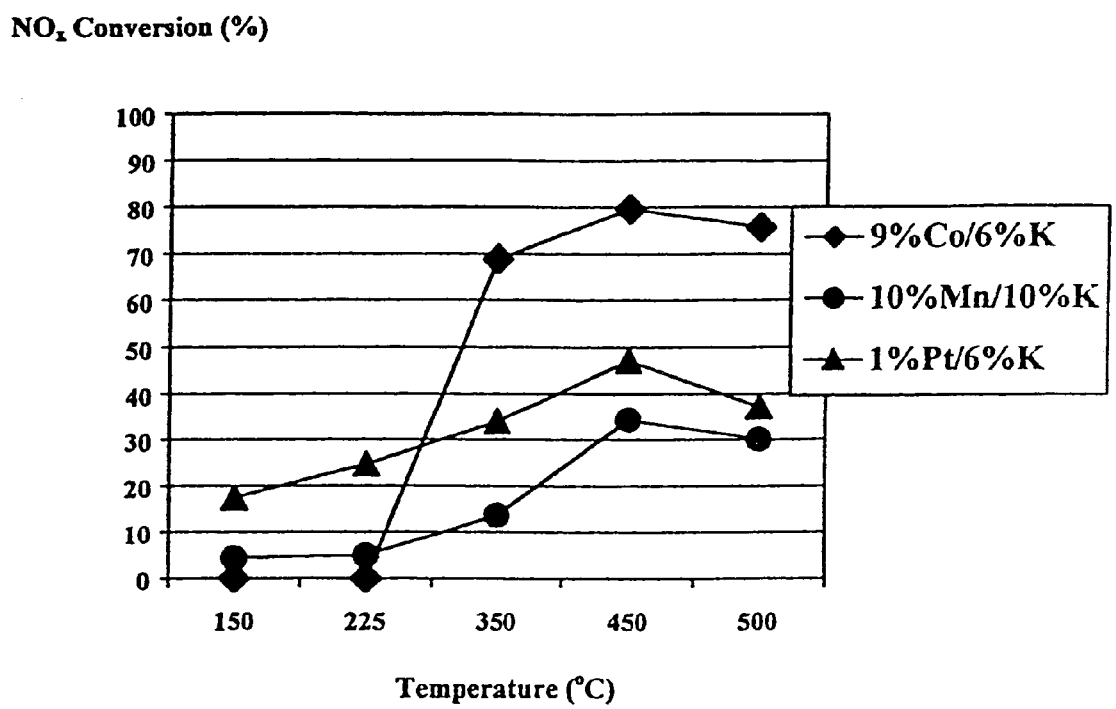
Figure 1. $NO_x$ conversion of 850 C aged samples at SV=25K with 120s lean/ 5s rich cycles

LEAN NO$_x$ TRAP/CONVERSION CATALYST

CROSS REFERENCE TO RELATED APPLICATIONS

This application is a divisional application of U.S. patent application Ser. No. 09/956,424 filed on Sep. 19, 2001, now U.S. Pat. No. 6,756,338.

FIELD OF THE INVENTION

The present invention relates to improvements in emission control for partial lean-burn vehicle engines. In particular, the present invention is directed to the emission control of nitrogen oxides from exhaust gas of internal combustion engines, including diesel engines.

BACKGROUND OF THE INVENTION

Exhaust gases from vehicle engines primarily contain carbon oxides (CO and $CO_2$), nitrogen oxides ($NO_x$), hydrocarbons, sulfur dioxide, and soot. At present, one of the most significant problems is removal of nitrogen oxides, $NO_x$, which are produced during high temperature combustion. In the case of "lean-burn" or partial lean-burn engines, in which there is an excess of oxygen in the exhaust gases, the reduction of $NO_x$ to $N_2$ is particularly difficult because reducing components in the exhaust are often completely consumed by the oxygen that is present in large excess.

Catalysts are employed in the exhaust systems of automotive vehicles to convert CO, $CO_2$, hydrocarbons, and $NO_x$, produced during engine operation into more desirable gases. When the engine is operated in a stoichiometric air/fuel ratio, catalysts containing palladium, platinum or rhodium, also known as "three way catalysts," are able to efficiently convert all the gases simultaneously. However, when the engine is operated in "lean-burn" conditions, to realize a benefit in fuel economy, such three way catalysts are able to convert CO and hydrocarbons, but are not efficient in the reduction of $NO_x$.

Previous attempts to develop a Lean $NO_x$ Catalyst (LNC) that will selectively catalyze $NO_x$ reduction by HC's has met with limited success. Catalyst materials developed to date that catalyze the HC-$NO_x$ reaction allow only about 30 to 50% $NO_x$ conversion under conditions of interest. These catalysts are usually either platinum (Pt) group metals (PGM) containing materials that function only at low temperatures (150-200° C.) or base metal materials that function at higher temperatures (300-600° C.). The LNC approach on its own, however, is not sufficient to achieve acceptable $NO_x$ reduction to allow future legislated limits to be achieved.

Certain alkali or alkaline earth metals such as potassium or strontium in combination with platinum are capable of storing or adsorbing nitrogen oxides under lean conditions, or in conditions of excess oxygen. More specifically, the platinum first oxidizes NO to $NO_2$ and the $NO_2$ subsequently forms a nitrate complex with the alkali or alkaline earth material. For simplicity herein, this sequence of reactions and adsorption shall be referred to as nitrogen oxides being adsorbed, even though NO is not adsorbed but is actually first converted to $NO_2$ which is then adsorbed. In a rich environment caused, for example, by a regeneration pulse, the nitrate is thermodynamically unstable and the stored $NO_x$ is released. The $NO_x$ then, with the aid of a catalyst, reacts with reducing species in the exhaust gas to form $N_2$. These adsorbents are known as Lean $NO_x$ Trap catalysts (LNT).

Some shortcomings have been identified for the LNT approach. First, a limited operating temperature window exists for the LNT. As with three-way catalysts, a minimum temperature is required for $NO_x$ adsorption and conversion. However, unlike the three-way catalysts, $NO_x$ adsorption and conversion decreases with increasing temperature above a certain temperature (usually about 350 to 400° C.), due to decreasing stability of the adsorbed nitrate. A second shortcoming of the LNT is the high cost due to the use of platinum group metals.

There remains a need for improved $NO_x$ conversion catalysts for automotive lean-burn operation emissions.

SUMMARY OF THE INVENTION

The present invention pertains to a process and composition which converts nitrogen oxides present in exhaust gas produced by an internal combustion engine. The composition of an adsorbent of the present invention comprises an oxide support and at least two components loaded on the oxide support and containing cobalt and at least one alkali metal or alkaline earth metal. The most preferred alkali metal is potassium, however other alkali metals may be used, such as cesium. The components may include additional constituents, such as platinum group metals, but in some cases may be used without any additional constituents. The process comprises the steps of contacting the exhaust gas containing nitrogen oxides with an adsorbent of the present invention, where the adsorbent adsorbs the nitrogen oxides in lean-burn conditions, and then recurrently reducing the oxygen concentration of the exhaust gas. The reduction in oxygen concentration is done in a manner to cause desorption of the nitrogen oxides and reduction of the nitrogen oxides in the exhaust gas to nitrogen.

In a preferred embodiment of the present invention, the process also includes contacting the exhaust gases with a catalyst such as a platinum group metal, before or while contacting the exhaust gases with the adsorbent. This step may be performed in order to increase the conversion of the nitrogen oxides in the exhaust gas. The selected catalyst or the platinum group metal may be deposited on the oxide support with the adsorbent, but is preferably disposed on the upstream side of the oxide support.

The present invention is also directed to an exhaust system for converting nitrogen oxides present in exhaust gas provided by an engine. The system includes an upstream catalyst and a downstream catalyst. The upstream catalyst may be a three way catalyst, a lean $NO_x$ catalyst, or an oxidation catalyst. The downstream catalyst is a lean $NO_x$ trap of the present invention.

It is understood that both the foregoing general description and the following detailed description are exemplary, but not restrictive, of the invention.

BRIEF DESCRIPTION OF THE DRAWINGS

The FIGURE is a graph showing nitrogen oxide conversion of the cobalt-potassium trap (also referred to herein as an "adsorbent") along with comparative examples.

DETAILED DESCRIPTION OF THE INVENTION

The present invention pertains to a process and composition which converts nitrogen oxides present in exhaust gas produced by an internal combustion engine. The phrase converting nitrogen oxides means that at least some, and preferably almost all, of the nitrogen oxides entering the catalyst are converted to nitrogen. The present invention is also directed to an internal combustion engine exhaust gas catalyst system comprising a nitrogen oxide trap (LNT) (also referred to herein as an "adsorbent"), and the process of converting $NO_x$ in exhaust gases from the engine.

The process for converting nitrogen oxides present in exhaust gases produced by an internal combustion engine first comprises the step of contacting the exhaust gas containing nitrogen oxides with an adsorbent of the present invention capable of adsorbing the nitrogen oxides in lean-burn conditions. The lean burn conditions involve an excess of oxygen, which is typical in exhaust gases. The adsorbent then stores the $NO_x$ during the conditions of excess oxygen. When the exhaust flowing into the LNT is lean (i.e. high oxygen content), NO in the exhaust is catalytically oxydized to $NO_2$ and then stored by the adsorbent as a nitrate salt.

The second step of the present process comprises recurrently reducing the oxygen concentration of the exhaust gas in a manner to cause desorption of the nitrogen oxides and reduction of the nitrogen oxides in the exhaust gas to nitrogen. Reducing the oxygen concentration in the exhaust gas produces a "rich" environment. Such a rich environment may be achieved by providing a regeneration pulse, which is a sharp decrease in the air-to-fuel ratio for a short period of time. The term "recurrent" as used herein is meant to encompass both reductions in the oxygen concentration at regular intervals and reductions at random intervals. The manner of effecting the decrease in oxygen concentration and the extent of the decrease is well-known in the art.

The stored nitrates during the rich, or oxygen deficient, environment are thermodynamically unstable, and thus are released by the adsorbent. The cobalt of the adsorbent also acts as a catalyst to catalyze a reaction between the $NO_x$ and the reducing species present in the exhaust gas, to produce $N_2$. Such a rich air-fuel ratio is used periodically as a regeneration pulse to assist in the regeneration of the LNT adsorbent. In the oxygen deficient environment present during the regeneration pulse, $NO_x$ compounds released from the adsorbent are catalytically reduced to $N_2$ upon contact with the catalyst in the presence of carbon monoxide and residual hydrocarbons in the exhaust gas.

The adsorbent of the present invention comprises cobalt (Co) and an alkali metal or alkaline earth metal, preferably potassium (K), and is loaded on an oxide support. The adsorbent of the present invention may be in the form of an LNT. As is well known, the metals referred to herein actually exist within the adsorbent or other catalysts as oxides. In addition, it is believed that an adsorbent of the present invention including cobalt and potassium form simple oxides, as opposed to compound oxides. The phrase "loaded on" is used to cover all manners in which a catalytically or adsorpively active component (e.g., cobalt or potassium) can be associated with an oxide, such as by being carried on the oxide or ion-exchanged onto the oxide.

Any known high surface area oxide support may be used, and the specifics of the support do not appear to be critical for the present invention. Both natural and synthetic zeolites as well as acidic, basic or neutral zeolites may be used as catalyst support material. Further, the support material may also comprise metal oxides such as, but not limited to, zirconium oxide ($ZrO_2$) and aluminum oxide ($Al_2O_3$). Other supports such as silica, titania, etc. may also be used. Preferred embodiments of the present invention incorporate ceria, or $CeO_2$, as the oxide support.

A preferred LNT for the present invention comprises cobalt and potassium on a ceria support. The Co/alkali and/or alkaline earth metal mixture may be binary or ternary. Binary mixtures include Co/K, Co/Cs, and Co/Ba. Examples of ternary mixtures include Co/K/Cs, Co/K/Ba, and Co/Cs/Ba. The relative amounts or the metals in the components will depend on a number of factors including the metals used, the exhaust environment, and the desired properties of the adsorbent. In many cases, the binary metal oxide particles of Co/alkali metal may contain Co and an alkali metal in mole ratios of between 5:1 to 1:5. More preferably, the binary ratio is between 2:1 to 1:2.

The LNT of the present invention may additionally include one or more platinum group metals (PGMs) as part of the catalyst system, in addition to the cobalt and the alkali and/or alkaline earth metal group. Platinum group metals include platinum, palladium and rhodium or a combination thereof. The amount of PGM to be used is well known in the art, however, a preferred weight percentage range would be from 0.01% to 5.0% of the total support material. In the present application, a PGM is not necessary for conversion of the $NO_x$ to $N_2$; however, it may be advantageous in some cases. For example, a PGM may be employed to increase low temperature activity or for higher thermal stability. The LNT of the present invention, however, does not require the use of a PGM for the conversion of $NO_x$. Cobalt serves as an effective catalyst for the reaction to take place between the nitrates and the reducing species in the exhaust gas to form nitrogen gas.

The present LNT composition can be used additionally with an upstream catalyst in an exhaust system, where the LNT of the present invention is placed downstream from such catalysts. The upstream catalyst aids in achieving a greater reduction of nitrogen oxides, at least during periods of oxygen reduction. Conventionally known three-way catalysts (TWC), lean $NO_x$ catalysts (LNC), or oxidation catalysts may be used for this purpose. As is well known, these upstream catalysts may perform other functions, such as HC or CO reduction.

The composition of the present invention can be made and used in a manner consistent with conventional LNTs. The cobalt and alkali or alkaline earth metal components may be applied to a substrate or washcoat, which are known in the art, as described in the following examples. The catalysts of the present invention, including Co/K are deposited on the support material, either simultaneously or sequentially. As seen generally from examples which follow, the composition can be made by mixing Co or a salt thereof with K or a salt thereof, dissolving the mixture in water, then loading it onto an oxide support such as $CeO_2$. The resulting powder is then dried at temperatures ranging from 60° C. to 150° C., although preferably at 120° C. for 12 hours. The dried powder is then calcined at temperatures ranging from 400° C. to 600° C., preferably at 500° C. for 4 hours.

As will be described by the test procedure and examples which follow, Co with preferably K or other alkali and/or alkaline earth metals results in higher $NO_x$ conversion, even at high temperatures such as 350° C. to 500° C. Thus, an improved LNT catalyst is described by the present invention. The operating temperature depends on the adsorbent used.

EXAMPLES

A nitrogen oxide trap according to an embodiment of the present invention was prepared as follows. In a slurry impregnation method, a solution of 4.6 g of $Co(NO_3)_2.6H_2O$ and 1.6 g of $KNO_3$ in 20 ml of water was added to a suspension of 10 g of $CeO_2$ in 50 ml of water. The mixture was evaporated while being vigorously stirred until achieving a paste, which was dried in an oven for 24 hours at 120° C. The resulting powder was calcined at 500° C. for 4 hours, then aged at 850° C. for 24 hours in air.

The samples were tested in a laboratory powder reactor with a procedure that consisted of a precondition followed by a lean-rich cycled test. 0.1 g of material was loaded in the reactor and the sample was exposed to a constant total gas flow rate of 200 standard cm$^3$/min.

The sample was preconditioned on ramp to 650° C., held for 15 minutes, cooled to 400° C., all under the rich conditions listed Table 1. The temperature was held at 400° C. and the cycle of 60 sec. lean/5 sec. rich for 20 cycles. Then the sample was cooled to 150° C. while cycling 30 sec. lean/10 sec. rich.

After preconditioning, the LNT activity was measured at 150° C. by exposing the sample to 10 cycles at 120 sec. lean/5 sec. rich and calculating $NO_x$ conversions for each of the last 3 cycles. The conversions for the 3 cycles were then averaged and reported as shown in FIG. 1. The LNT activity measurement was then repeated at 150, 225, 350, 450, and 500° C.

TABLE 1

| | Gas Compositions | |
|---|---|---|
| GAS | RICH | LEAN |
| NO | 500 ppm | 500 ppm |
| $CO_2$ | 10% | 10% |
| $O_2$ | — | 12% |
| CO | 7.5% | — |
| $H_2$ | 2.5% | — |

As seen from FIG. 1, the Co/K sample prepared by slurry impregnation method was compared with Mn/K supported on $CeO_2$ and Pt/K supported on $Al_2O_3$. The Co/K LNT showed significantly higher percentage conversion of the $NO_x$ at higher temperatures than the Mn/K and Pt/K. The following Table 2 compares the results of the Test procedure:

TABLE 2

| $NO_x$ Conversion of 850° C. Aged Samples at SV = 25 K with 120 sec. lean/5 sec. rich | | | |
|---|---|---|---|
| | 350° C. | 450° C. | 500° C. |
| 9% Co/6% K | 69% | 80% | 78% |
| 10% Mn/10% K | 12% | 33% | 30% |
| 1% Pt/6% K | 32% | 45% | 37% |

The present catalyst system shows higher LNT $NO_x$ conversion activity in middle to high temperature ranges (i.e. 350-500° C.) compared to previous adsorbent materials such as Ba, K, Cs, or Mn/K. Additionally, the Co/K material does not require a platinum group metal to convert NO to $NO_2$ for storage. The metal oxide-supported Mn/K system shows similar characteristics. As seen from FIG. 1, however, the Co/K system is more active and has a higher thermal durability than the Mn/K system. After aging at 850° C. for 24 hours in air, the Co/K system showed substantially better LNT activity than the Mn/K system.

The following supplemental examples are representative, not limiting of the invention.

Example 1

In an incipient wetness impregnation method may also be used, 4.6 g of $Co(NO_3)_2.6H_2O$ and 1.6 g of $KNO_3$ (or 1.6 g of KOAc) were dissolved in 2.5 ml of water. 10 g of $CeO_2$ was impregnated with the above solution via sequential or co-impregnation. The resulting powder was dried in an oven for 24 hours at 120° C., calcined at 500° C. for 4 hours, then aged at 850° C. for 24 hours in air.

The $NO_x$ conversion of Co/K supported on $CeO_2$ showed similar activities at the same composition, regardless of the preparation method.

Example 2

A solution of 9.8 g of $Co(NO_3)_2.6H_2O$ and 3.4 g of $KNO_3$ in 20 ml of water was added to a suspension of 20 g of $CeO_2$ in 50 ml of water. The mixture was evaporated while being vigorously stirred until achieving a paste, which was dried in an oven for 24 h at 120° C. It was calcined at 500° C. for 4 hours and aged at 850° C. for 24 hours in air.

$NO_x$ conversion (%) at 120s lean/5s rich cycles: 76% at 350° C., 81% at 450° C. and 75% at 500° C.

Example 3

3.11 g of $Co(NO_3)_2.6H_2O$ was dissolved in 2.3 ml of water, and then impregnated onto 10 g of $CeO_2$. The powder was dried in an oven for 24 hours at 120° C. and calcined at 500° C. for 4 hours. A 1.6 g of $KNO_3$ was dissolved in 3.5 ml of water, and then impregnated onto the Co/$CeO_2$. The resulting powder was dried in an oven for 24 hours at 120° C. The sample was calcined at 500° C. for 4 hours and aged at 850° C. for 24 hours in air.

$NO_x$ conversion (%) at 120s lean/5s rich cycles: 79% at 350° C., 84% at 450° C. and 76% at 500° C.

Example 4

4.69 g of $Co(NO_3)_2.6H_2O$ was dissolved in 2.0 ml of water, and then impregnated onto 10 g of $CeO_2$. The powder was dried in an oven for 24 hours at 120° C. then calcined at 500° C. for 4 hours. 1.1 g of $KNO_3$ was dissolved in 3.5 ml of water, and then impregnated onto the Co/$CeO_2$. The resulting powder was dried in an oven for 24 hours at 120° C., calcined at 500° C. for 4 hours, and aged at 850° C. for 24 hours in air.

$NO_x$ conversion (%) at 120s lean/5s rich cycles: 75% at 350° C., 82% at 450° C. and 76% at 500° C.

Example 5

3.11 g of $Co(NO_3)_2.6H_2O$ was dissolved in 2.3 ml of water, and then impregnated onto 10 g of $CeO_2$. The powder was dried in an oven for 24 hours at 120° C. and calcined at 500° C. for 4 hours. 1.1 g of $KNO_3$ was dissolved in 3.5 ml of water, and then impregnated onto Co/$CeO_2$. The resulting powder was dried in an oven for 24 hours at 120° C., calcined at 500° C. for 4 hours and aged at 850° C. for 24 hours in air.

$NO_x$ conversion (%) at 120s lean/5s rich cycles: 81% at 350° C., 85% at 450° C. and 79% at 500° C.

Example 6

A solution of 7.0 g of $Co(NO_3)_2.6H_2O$ and 6.0 g of $Ba(NO_3)_2$ in 65 ml of water was added to a suspension of 20 g of $CeO_2$ in 50 ml of water. The mixture was evaporated while being vigorously stirred until achieving a paste, which was dried in an oven for 24 hours at 120° C. The sample was then calcined at 500° C. for 4 hours and aged at 850° C. for 24 hours in air.

$NO_x$ conversion (%) at 120s lean/5s rich cycles: 20% at 350° C., 15% at 450° C. and 14% at 500° C.

Example 7

A 1.38 g of $Co(NO_3)_2.6H_2O$ and 1.4 ml of Cs solution (436 g Cs/L) was dissolved in 3.5 ml of water, and then impregnated onto 10 g of CeO$_2$. The powder was dried in an oven for 24 hours at 120° C., calcined at 500° C. for 4 hours, then aged at 850° C. for 24 hours in air.

NO$_x$ conversion (%) at 120s lean/5s rich cycles: 25% at 350° C., 19% at 450° C. and 18% at 500° C.

Example 8

A solution of 3.1 g of Co(NO$_3$)$_2$.6H$_2$O, 1.1 g of KNO$_3$ and 3.3 ml of Cs solution (436 g Cs/L) in 20 ml of water was added to a suspension of 20 g of CeO$_2$ in 50 ml of water. The mixture was evaporated while being vigorously stirred until achieving a paste, which was dried in an oven for 24 hours at 120° C., calcined at 500° C. for 4 hours, then aged at 850° C. for 24 hours in air.

NO$_x$ conversion (%) at 120s lean/5s rich cycles: 25% at 350° C., 48% at 450° C. and 46% at 500° C.

Example 1 was similar to the test procedure (uses same amount of Co/K), except an impregnation method was used. Examples 2-5 used different ratios of Co and K as the washcoat. Example 6 used the binary mixture of Co and Ba. Example 7 used Co and Cs. Example 8 used the ternary mixture of Co/K and Cs. Resulting NO$_x$ conversion of each example at varying temperatures is listed in Table 3.

TABLE 3

| | NO$_x$ conversion at 120 sec. lean/5 sec. rich cycles | | | |
|---|---|---|---|---|
| | LNT | 350° C. | 450° C. | 500° C. |
| Test Procedure | Co/K on CeO$_2$ | 69% | 80% | 78% |
| Example 1 | Co/K on CeO$_2$ | 69% | 80% | 78% |
| Example 2 | Co/K on CeO$_2$ | 76% | 81% | 75% |
| Example 3 | K on Co/CeO$_2$ | 79% | 84% | 76% |
| Example 4 | K on Co/CeO$_2$ | 75% | 82% | 76% |
| Example 5 | K on Co/CeO$_2$ | 81% | 85% | 79% |
| Example 6 | Co/Ba on CeO$_2$ | 20% | 15% | 14% |
| Example 7 | Co/Cs on CeO$_2$ | 25% | 19% | 18% |
| Example 8 | Co/K/Cs on CeO$_2$ | 25% | 48% | 46% |

The results of the Examples for the present invention show a relatively high NO$_x$ conversion at the temperature range from 350° C. to 500° C. Example 6-example 8 have used Ba or Cs and have shown lower NO$_x$ conversion than the previous use of K. As stated before, although other alkali metals are contemplated for use with the present LNT, the preferred alkali metal is K. These examples are merely representative of the present invention and are not limiting in any way.

Although illustrated and described herein with reference to certain specific embodiments and examples, the present invention is nevertheless not intended to be limited to the details shown. Rather, various modifications may be made in the details within the scope and range of equivalents of the claims and without departing from the spirit of the invention.

What is claimed:

1. A process for converting nitrogen oxides present in exhaust gas produced by an engine, said process comprising the steps of:

contacting said exhaust gas containing nitrogen oxides with an adsorbent consisting of:
an oxide support; and
at least two components loaded on said support and consisting of cobalt and at least one alkali metal or alkaline earth metal, wherein said nitrogen oxides are adsorbed by said adsorbent in lean-burn conditions; and recurrently reducing oxygen concentration of said exhaust gas to cause desorption of said nitrogen oxides from said adsorbent and reduction of said nitrogen oxides to nitrogen.

2. The process of claim 1, wherein said at least one alkali or alkaline earth metal is selected from the group consisting of potassium, cesium, and barium.

3. The process of claim 1, wherein said at least two components consist of said cobalt and said at least one alkali or alkaline earth metal in a mole ratio of between 5:1 to 1:5.

4. The process of claim 1, wherein said at least two components consist of said cobalt and said at least one alkali or alkaline earth metal in a mole ratio of between 2:1 to 1:2.

5. The process of claim 1 further comprising, prior to said step of contacting said exhaust gas containing nitrogen oxides with said adsorbent, contacting said exhaust gas with a catalyst adapted to reduce a portion of said nitrogen oxides at least during periods of oxygen reduction.

6. The process of claim 5, wherein said catalyst comprises a platinum group metal.

7. The process of claim 1, wherein said oxide support comprises ceria.

8. The process of claim 1, wherein said oxide support consists of ceria.

9. The process of claim 1, wherein said at least one alkali metal or alkaline earth metal consists of potassium.

10. The process of claim 9, wherein said cobalt is in the form of cobalt oxide and said potassium is in the form of potassium oxide.

11. The process of claim 10, wherein said cobalt oxide and said potassium oxide are in the form of simple oxides.

12. The process of claim 1, wherein said at least two components consist of a binary mixture of cobalt and potassium.

13. A process for converting nitrogen oxides present in exhaust gases produced by an engine, said process comprising the steps of:

contacting said exhaust gas containing nitrogen oxides with an adsorbent consisting of:
an oxide support; and
two components loaded on said support and consisting of cobalt and potassium, wherein said nitrogen oxides are adsorbed by said adsorbent in lean-burn conditions; and recurrently reducing oxygen concentration of said exhaust gas to cause desorption of said nitrogen oxides from said adsorbent and reduction of said nitrogen oxides to nitrogen.

* * * * *